United States Patent
Hooda et al.

(10) Patent No.: US 10,454,882 B2
(45) Date of Patent: Oct. 22, 2019

(54) DHCP IN LAYER-3 OVERLAY WITH ANYCAST ADDRESS SUPPORT AND NETWORK ADDRESS TRANSPARENCY

(71) Applicant: Cisco Technology, Inc., San Jose, CA (US)

(72) Inventors: Sanjay Kumar Hooda, Pleasanton, CA (US); Aniket Ghule, Newark, CA (US); Vimarsh Puneet, Milpitas, CA (US); Atri Indiresan, Sunnyale, CA (US)

(73) Assignee: Cisco Technology, Inc., San Jose, CA (US)

( * ) Notice: Subject to any disclaimer, the term of this patent is extended or adjusted under 35 U.S.C. 154(b) by 48 days.

(21) Appl. No.: 15/638,413

(22) Filed: Jun. 30, 2017

(65) Prior Publication Data
US 2019/0007368 A1    Jan. 3, 2019

(51) Int. Cl.
*H04L 12/46* (2006.01)
*H04L 29/06* (2006.01)
*H04L 29/12* (2006.01)

(52) U.S. Cl.
CPC ...... *H04L 61/2015* (2013.01); *H04L 12/4633* (2013.01); *H04L 12/4645* (2013.01); *H04L 63/0272* (2013.01); *H04L 63/0471* (2013.01)

(58) Field of Classification Search
CPC ... H04L 12/4633; H04L 12/4641–4695; H04L 29/0653–06625; H04L 41/04–048; H04L 49/35–358; H04L 61/20–2015; H04L 61/2061; H04L 61/2076–2592; H04L 63/02–029; H04L 63/0471; H04L 69/22; H04W 88/04
See application file for complete search history.

(56) References Cited

U.S. PATENT DOCUMENTS

| | | |
|---|---|---|
| 6,456,624 B1 | 9/2002 | Eccles et al. |
| 7,152,117 B1 | 12/2006 | Stapp et al. |
| 7,177,946 B1 | 2/2007 | Kaluve et al. |
| 7,826,400 B2 | 11/2010 | Sakauchi |
| 7,848,340 B2 | 12/2010 | Sakauchi et al. |
| 8,339,973 B1 | 12/2012 | Pichumani et al. |
| 9,374,294 B1 | 6/2016 | Pani |
| 9,444,634 B2 | 9/2016 | Pani et al. |
| 2003/0067912 A1 | 4/2003 | Mead et al. |
| 2003/0115319 A1 | 6/2003 | Dawson et al. |
| 2004/0103310 A1 | 5/2004 | Sobel et al. |
| 2005/0010685 A1 | 1/2005 | Ramnath et al. |
| 2005/0083835 A1 | 4/2005 | Prairie et al. |

(Continued)

*Primary Examiner* — Timothy J Weidner
(74) *Attorney, Agent, or Firm* — Merchant & Gould P.C.

(57) ABSTRACT

Address support and network address transparency may be provided. First, a border device may receive a processed network configuration parameter request having an address of a subnet to which a client device is associated and information data in an information field of the network configuration parameter request. The information data may comprise an address of a network device and an identifier of the subnet to which the client device is associated. Next, the border device may encapsulate the processed network configuration parameter request with the information data extracted from the processed network configuration parameter request. The border device may then forward the encapsulated network configuration parameter response to the network device.

20 Claims, 3 Drawing Sheets

(56) References Cited

U.S. PATENT DOCUMENTS

| | | |
|---|---|---|
| 2005/0117593 A1 | 6/2005 | Shand |
| 2005/0175020 A1 | 8/2005 | Park et al. |
| 2006/0013143 A1 | 1/2006 | Yasuie et al. |
| 2006/0072461 A1 | 4/2006 | Luong et al. |
| 2006/0221950 A1 | 10/2006 | Heer |
| 2006/0227790 A1 | 10/2006 | Yeung et al. |
| 2006/0268742 A1 | 11/2006 | Chu et al. |
| 2006/0274647 A1 | 12/2006 | Wang et al. |
| 2006/0280179 A1 | 12/2006 | Meier |
| 2007/0047463 A1 | 3/2007 | Jarvis et al. |
| 2007/0165515 A1 | 7/2007 | Vasseur |
| 2007/0171814 A1 | 7/2007 | Florit et al. |
| 2007/0177525 A1 | 8/2007 | Wijnands et al. |
| 2007/0183337 A1 | 8/2007 | Cashman et al. |
| 2007/0217415 A1 | 9/2007 | Wijnands et al. |
| 2008/0031130 A1 | 2/2008 | Raj et al. |
| 2008/0046571 A1* | 2/2008 | Tuononen ........... H04L 61/2015 709/227 |
| 2008/0109559 A1* | 5/2008 | Chhabra ............ H04L 12/2856 709/238 |
| 2008/0212496 A1 | 9/2008 | Zou |
| 2009/0067322 A1 | 3/2009 | Shand et al. |
| 2009/0094357 A1 | 4/2009 | Keohane et al. |
| 2009/0161567 A1 | 6/2009 | Jayawardena et al. |
| 2009/0232011 A1 | 9/2009 | Li et al. |
| 2009/0238196 A1 | 9/2009 | Ukita et al. |
| 2010/0020719 A1 | 1/2010 | Chu et al. |
| 2010/0020726 A1 | 1/2010 | Chu et al. |
| 2010/0191813 A1 | 7/2010 | Gandhewar et al. |
| 2010/0191839 A1 | 7/2010 | Gandhewar et al. |
| 2011/0022725 A1 | 1/2011 | Farkas |
| 2011/0170426 A1 | 7/2011 | Kompella et al. |
| 2011/0199891 A1 | 8/2011 | Chen |
| 2011/0199941 A1 | 8/2011 | Ouellette et al. |
| 2011/0243136 A1 | 10/2011 | Raman et al. |
| 2011/0280572 A1 | 11/2011 | Vobbilisetty et al. |
| 2011/0286447 A1 | 11/2011 | Liu et al. |
| 2011/0299406 A1 | 12/2011 | Vobbilisetty et al. |
| 2012/0030150 A1 | 2/2012 | McAuley et al. |
| 2012/0057505 A1 | 3/2012 | Xue |
| 2012/0300669 A1 | 11/2012 | Zahavi |
| 2013/0097335 A1 | 4/2013 | Jiang et al. |
| 2013/0182712 A1 | 7/2013 | Aguayo et al. |
| 2013/0208624 A1 | 8/2013 | Ashwood-Smith |
| 2013/0223276 A1 | 8/2013 | Padgett |
| 2013/0227689 A1 | 8/2013 | Pietrowicz et al. |
| 2013/0250779 A1 | 9/2013 | Meloche et al. |
| 2013/0250951 A1 | 9/2013 | Koganti |
| 2013/0276129 A1 | 10/2013 | Nelson et al. |
| 2013/0311663 A1 | 11/2013 | Kamath et al. |
| 2013/0322446 A1 | 12/2013 | Biswas et al. |
| 2013/0326014 A1* | 12/2013 | Niu ..................... H04L 61/2061 709/217 |
| 2013/0329605 A1 | 12/2013 | Nakil et al. |
| 2013/0332399 A1 | 12/2013 | Reddy et al. |
| 2013/0332577 A1 | 12/2013 | Nakil et al. |
| 2013/0332602 A1 | 12/2013 | Nakil et al. |
| 2014/0016501 A1 | 1/2014 | Kamath et al. |
| 2014/0086097 A1 | 3/2014 | Qu et al. |
| 2014/0146817 A1 | 5/2014 | Zhang |
| 2014/0149819 A1 | 5/2014 | Lu et al. |
| 2014/0219275 A1 | 8/2014 | Allan et al. |
| 2014/0269712 A1 | 9/2014 | Kidambi |
| 2015/0016277 A1 | 1/2015 | Smith et al. |
| 2015/0092593 A1 | 4/2015 | Kompella |
| 2015/0124586 A1 | 5/2015 | Pani |
| 2015/0124587 A1 | 5/2015 | Pani |
| 2015/0124629 A1 | 5/2015 | Pani |
| 2015/0124642 A1 | 5/2015 | Pani |
| 2015/0124644 A1 | 5/2015 | Pani |
| 2015/0124654 A1 | 5/2015 | Pani |
| 2015/0124823 A1* | 5/2015 | Pani ..................... H04L 12/18 370/392 |
| 2015/0127701 A1 | 5/2015 | Chu et al. |
| 2015/0188771 A1 | 7/2015 | Allan et al. |

* cited by examiner

DHCP IN LAYER-3 OVERLAY WITH ANYCAST ADDRESS SUPPORT AND NETWORK ADDRESS TRANSPARENCY

TECHNICAL FIELD

The present disclosure relates generally to anycast address support and network address transparency.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet. Client address based forwarding of Dynamic Host Configuration Protocol (DHCP) response packets.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
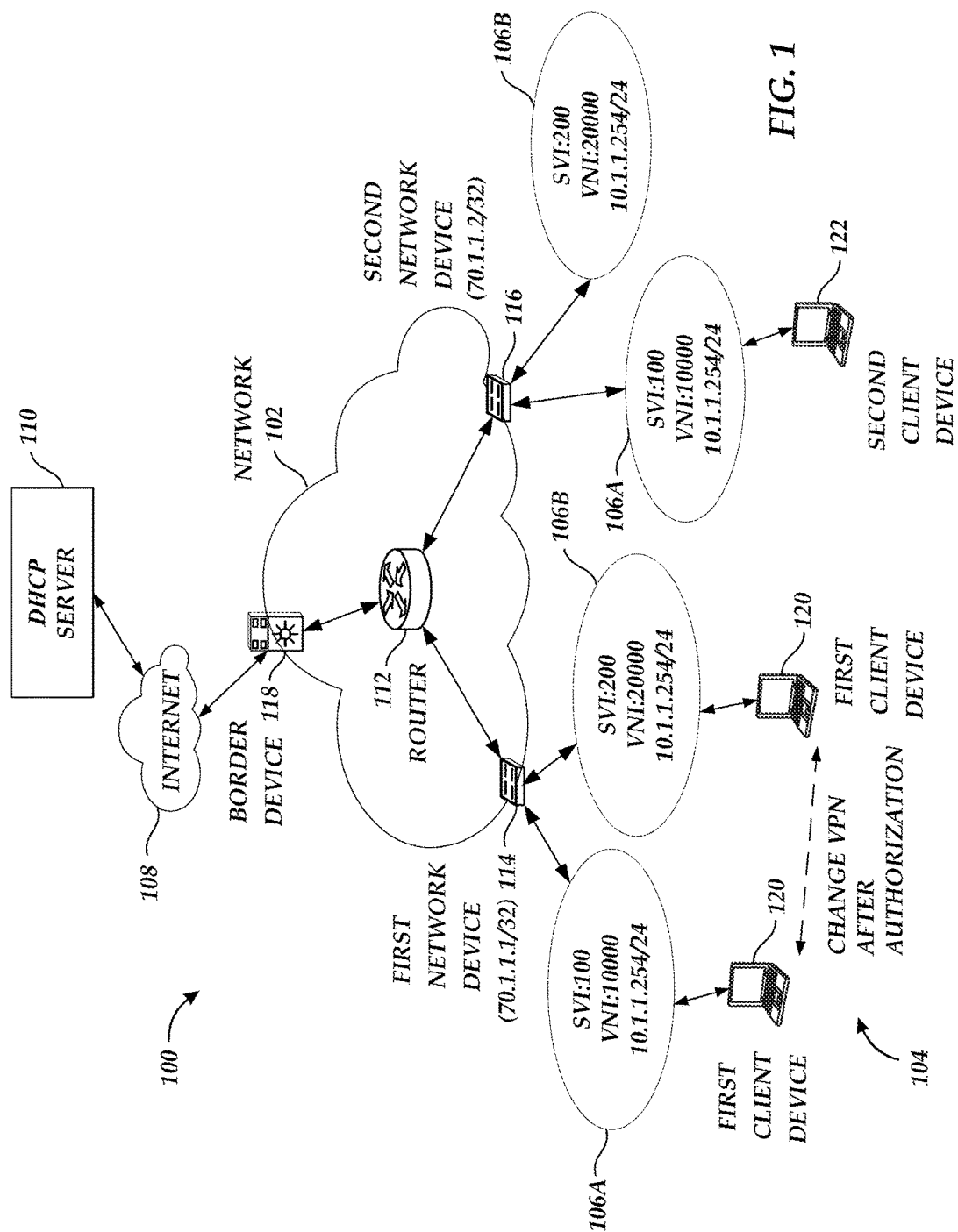
FIG. 1 shows a system for providing anycast address support and network address transparency.

DHCP in a fabric network with anycast address support and network address transparency may be provided. First, a border device may receive a processed network configuration parameter request having an address of a subnet to which a client device is associated and information data in an information field of the network configuration parameter request. The information data may comprise an address of a network device and an identifier of the subnet to which the client device is associated. Next, the border device may encapsulate the processed network configuration parameter request with the information data extracted from the processed network configuration parameter request. The border device may then forward the encapsulated network configuration parameter request to the network device.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A fabric network may comprise a network topology in which components pass data to each other through interconnecting network nodes (e.g., devices). Fabric networks comprise overlay and underlay. The underlay deals with connectivity between fabric network devices and the overlay deals with user traffic transiting the fabric network. The fabric network overlay may comprise functional components such as fabric edge (FE) devices, fabric intermediate devices, fabric border (FB) devices, and a map resolver/server.

In the fabric network overlay, FE devices may comprise, for example, Locator/ID Separation Protocol (LISP) xTR (Ingress/Egress Tunnel Router)/PxTR (Proxy xTR) nodes and FB devices may comprise, for example, LISP PxTR (Proxy xTR) nodes. End points (e.g., client devices including hosts) may be attached to the FE devices. The end points may be in endpoint identification (EID) space with each endpoint having an EID. Each device in the fabric network (e.g., FE devices and FB devices) may be configured with an address (e.g., a locator address). FE devices may register discovered EIDs (from the end points) with a fabric host-tracking database running on the map resolver/server associating the discovered EID to, for example, the configured locator address of the FE device that discovered it.

When a local FE device receives a packet from a local end point destined to a remote end point (i.e., on a remote FE device) whose location is not known, the local FE device may send a map request message to the map resolver/server. Once the local FE device receives a reply message back from the map resolver/server associating the unknown EID to the remote locator address, all subsequent traffic from the local end point may be encapsulated (e.g., LISP encapsulated) and forwarded to the remote locator address (i.e., remote FE device). Once the encapsulated packet is received on the remote FE device, the remote FE device may decapsulate the packet and forward natively (e.g., to the remote endpoint).

FB devices may connect the fabric network to the native routing domain. FB devices may be configured, for example, as LISP PxTR nodes and may provide a default gateway service to the FE nodes. Communication may happen through the FB device configured, for example, as a LISP PxTR node. When an FE device receives a packet from a local end point destined to a host outside the fabric network in the native routing domain, the FE device may encapsulate and send the packet to the FB device. The FB device may provide, for example, the LISP PxTR functionality and advertise itself as a next-hop address for all the fabric managed EID prefixes to the native routing domain so that it can steer the traffic.

Fabric overlay may provide the following services. For example, fabric overlay may provide stretched Layer-2 service using Layer-3 overlay, which may provide the flexibility of extending a subnet to any part of the fabric network. For example, a subnet may be present across multiple FE devices with the same anycast gateway Internet Protocol (IP) address to allow for roaming by allowing endpoints to continue using the same gateway IP address. The provided services may also include Layer-3 overlay service and built-in mobility.

FIG. 1 shows a system 100 consistent with embodiments of the disclosure for providing anycast address support and network address transparency. As shown in FIG. 1, system 100 may comprise a first network 102, a plurality of client devices 104, a first local subnet 106A, a second local subnet 106B, a second network 108, and a Dynamic Host Configuration Protocol (DHCP) server 110. First network 102 may comprise a plurality of network devices including, but not limited to, a router 112, a first network device 114, a second network device 116, intermediate network devices (not shown), and a border device 118. Plurality of client devices 104 may comprise a first client device 120 and a second client device 122. First local subnet 106A and second local subnet 106B may be stretched across multiple FE devices, for example, first local subnet 106A and second local subnet 106B may be stretched across first network device 114 and second network device 116. Second network 108 may comprise a network outside first network 102, for example, the Internet. First local subnet 106A and second local subnet 106B, may comprise, but are not limited to Virtual Private Networks (VPNs).

The plurality of network devices in network 102 may comprise, but are not limited to, switches and routers for example. Network 102 may comprise any number of network devices. Plurality of client devices 104 may comprise any number of client devices and is not limited to two. Each of plurality of client devices 104 may comprise any type device wishing to communicate over network 102. For example, each of plurality of client devices 104 may comprise, but are not limited to, a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device.

Network 102 may comprise a fabric network. The fabric network may comprise an underlay and an overlay. The underlay may deal with connectivity between fabric elements (e.g., network devices) and the overlay may deal with user traffic entering the fabric. Traffic may enter the fabric network (i.e., network 102) through FE devices (e.g., first network device 114 and second network device 116). The traffic may be routed through network 102 via a plurality of intermediate network devices within the plurality of network devices. The FE devices may be responsible for encapsulating a packet with a fabric header that contains an egress FE device address. When a packet (e.g., frame) arrives at the egress FE device, a fabric header may be stripped off and the native packet may be forwarded according to an inner address. The fabric network may be capable of providing layer-2 and layer-3 services on top of the underlay. The fabric network may have endpoints (e.g., plurality of client devices 104) connected to it.

Fabric networks may provide an experience where users do not have to provide a Virtual Local Area Network (VLAN) while working on the network as the polices may no longer be dependent on the IP address, but on a group tag. This may work, for example, when the authentication is IEEE802.1x or if a static authentication/no-authentication is used in fabric networks. Fabric networks may use an anycast address that is available across all the FE nodes. This anycast address may be used as a Gateway IP Address (GIADDR) in a DHCP Request, thus making it impossible to send back a DHCP offer to the right switch in conventional systems. In addition, fabric networks may need to provide IP transparency (i.e., the user is moved to a new Virtual Network or new Virtual Network Identifier (VNI) after authentication).

Consistent with embodiments of the disclosure, the aforementioned issues may be addressed in fabric networks with layer-3 and Layer-2 overlay by using, for example, the DHCP Option 82 field. In the option 82 field two values {Source-Switch-IP address, VNI} may be inserted. Then, when the DHCP offer comes back from DHCP server 110, border device 118 may look at the option 82 field and use the Source-Switch-IP address and VNI to create a VXLAN header and send the DHCP offer to the right network device. By using {Source-Switch-IP address, VNI} in the option-82 field of DHCP packet, the fabric networks may make the DHCP work with any DHCP server without any special configurations.

Figure 2:
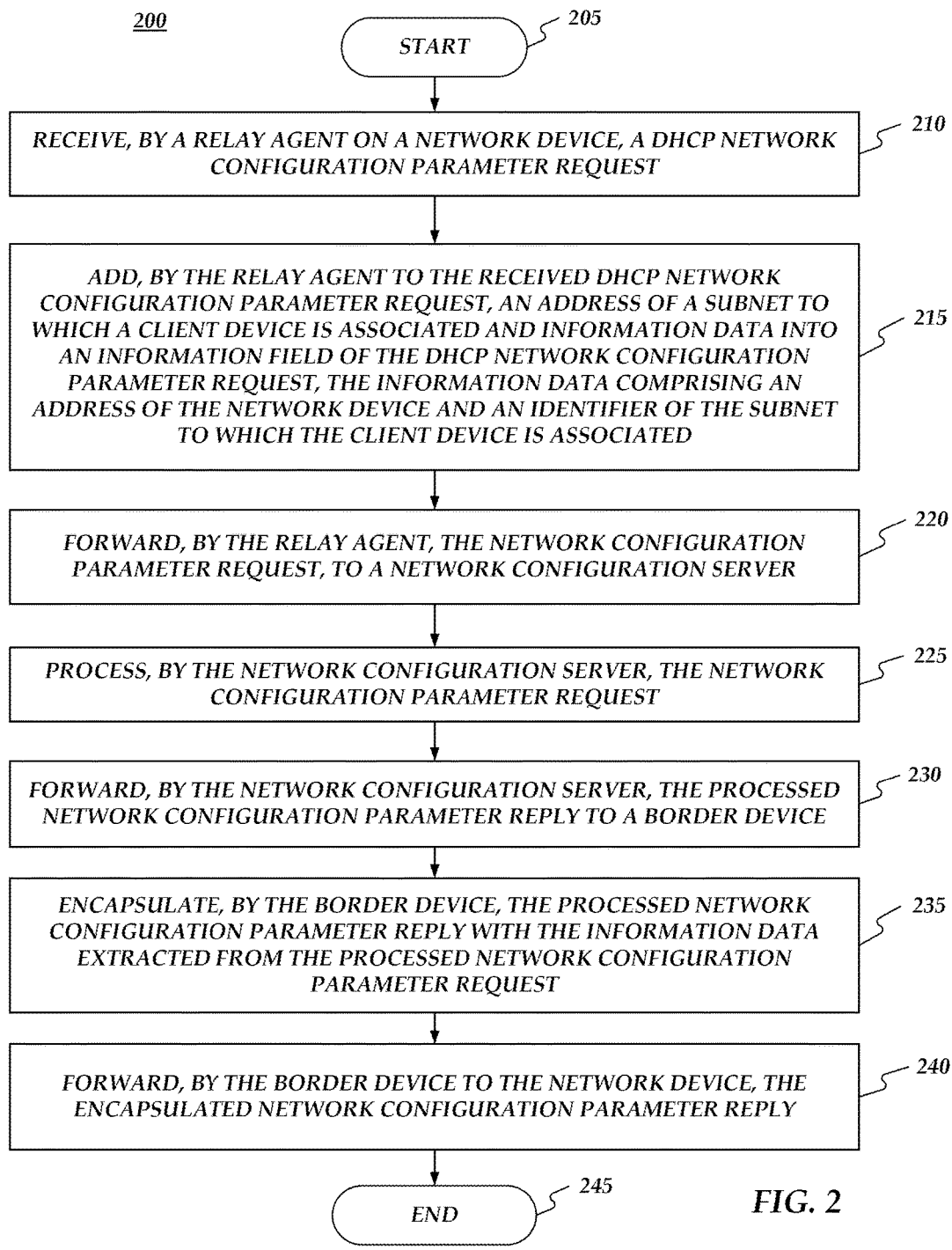
FIG. 2 is a flow chart of a method for providing anycast address support and network address transparency.

FIG. 2 is a flow chart setting forth the general stages involved in a method 200 consistent with an embodiment of the invention for providing anycast address support and network address transparency. Method 200 may be implemented using system 100 as described in more detail above with respect to FIG. 1. Ways to implement the stages of method 200 will be described in greater detail below.

Method 200 may begin at starting block 205 and proceed to stage 210 where a relay agent on first network device 114 may receive a network configuration parameter request. For example, the network configuration parameter request may comprise a DHCP request. First client device 120 may send the DHCP request over first local subnet 106A to the relay agent on first network device 114. DHCP server 110 may dynamically distribute network configuration parameters, such as IP addresses, for interfaces and services for example.

From stage 210, where the relay agent on first network device 114 receives the network configuration parameter request, method 200 may advance to stage 215 where the relay agent may add to the received network configuration parameter request, an address (e.g., Gateway IP Address (GIADDR)) of a subnet (i.e., first local subnet 106A) to which first network device 114 associated. As shown in the FIG. 1 example, the address of the subnet to which first network device 114 associated may comprise (10.1.1.254).

The relay agent may also add information data into an information field of the network configuration parameter request. The information field may comprise a DHCP option 82 field. The information data added to the information field may comprise an address of the network device (e.g., first network device 114) and an identifier of the subnet (e.g., first local subnet 106A) to which first client device 120 is associated. For example, {Source-Switch-IP address, VNI}. As shown in FIG. 1 example, the information field may comprise {70.1.1.1, 10000}. The address of the network device may be contained, for example, in sub-fields of the DHCP option 82 field. These sub-fields may comprise, for example, a circuit ID field or a remote ID field.

Once the relay agent adds to the received network configuration parameter request in stage 215, method 200 may continue to stage 220 where the relay agent may forward the network configuration parameter request to a network configuration server (e.g., DHCP sever 110). For example, first network device 114 may route the network configuration parameter request in network 102 through router 112 to border device 118. Border device 118 may then send the network configuration parameter request to DHCP sever 110 for servicing.

After relay agent forwards the network configuration parameter request in stage 220, method 200 may proceed to stage 225 where the network configuration server (e.g., DHCP sever 110) may process the network configuration parameter request. For example, DHCP sever 110 may service the network configuration parameter request comprising a DHCP request.

From stage 225, where the network configuration server (e.g., DHCP sever 110) processes the network configuration parameter request, method 200 may advance to stage 230 where the network configuration server (e.g. DHCP sever 110) may forward the processed network configuration parameter request to border device 118. For example, DHCP server 118 may receive the network configuration parameter request (e.g., DHCP Request) and after processing, may send the response (e.g., DHCP offer) back to network 102. As shown in the FIG. 1 example, because the Source-Switch-IP address of the processed network configuration parameter request was that of first network device 114, DHCP server 118 may send the response back to GIADDR=10.1.1.254.

Also, in the response sent by DHCP server 118, the information data added to the information field (e.g., option 82 field) may still comprise the address of the network device (e.g., first network device 114) and the identifier of the subnet (e.g., first local subnet 106A) to which first client device 120 is associated. In other words, the information field may still comprise {70.1.1.1, 10000} for the example shown in FIG. 1.

Once the network configuration server (e.g., DHCP sever 110) forwards the processed network configuration parameter response to border device 118 in stage 230, method 200 may continue to stage 235 where border device 118 may encapsulate the processed network configuration parameter response with the information data extracted from the processed network configuration parameter response. For example, border device 118 may receive the DHCP offer and then look at the information field (e.g., the option 82 field) and find the {Source-Switch-IP address, VNI} (e.g., {70.1.1.1, 10000} for the example shown in FIG. 1). Border device 118 may encapsulate data from the information field, for example, in the fabric header by using Source-Switch-IP address=70.1.1.1 and VNI=10000.

After border device 118 encapsulates the processed network configuration parameter response in stage 235, method 200 may proceed to stage 240 where border device 118 may forward the encapsulated network configuration parameter response to first network device 114. Once border device 118 forwards the encapsulated network configuration parameter response to first network device 114 in stage 240, method 200 may then end at stage 245.

Figure 3:
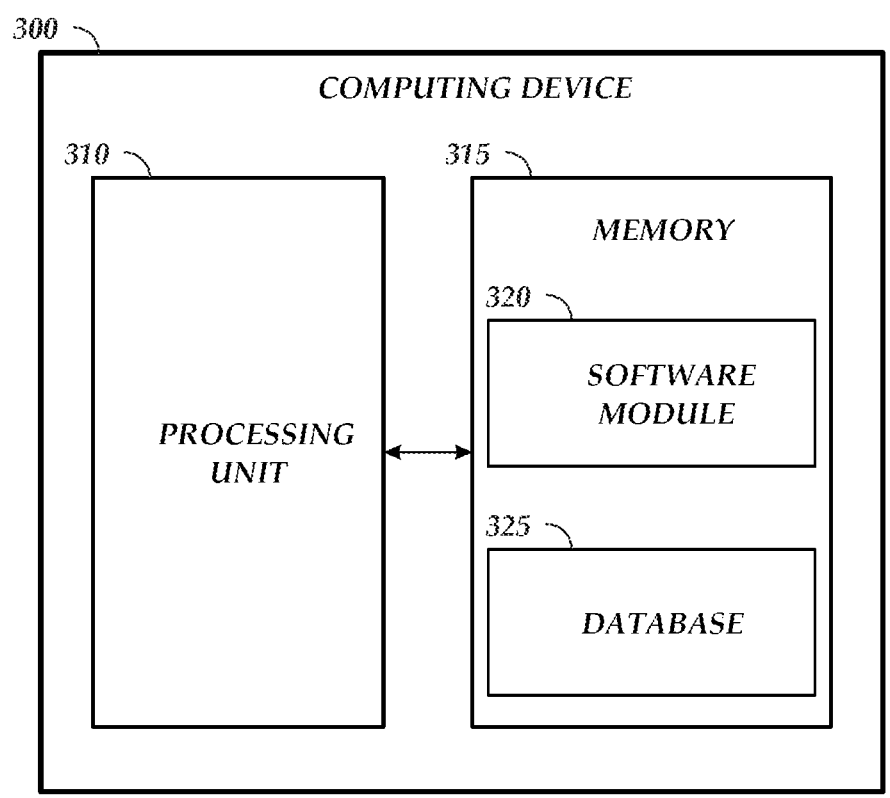
FIG. 3 shows a computing device.

FIG. 3 shows a computing device 300. As shown in FIG. 3, computing device 300 may include a processing unit 310 and a memory unit 315. Memory unit 315 may include a software module 320 and a database 325. While executing on processing unit 310, software module 320 may perform processes for providing anycast address support and network address transparency, including for example, any one or more of the stages from method 200 described above with respect to FIG. 2. Computing device 300, for example, may provide an operating environment for any of DHCP server 110, router 112, first network device 114, second network device 116, border device 118, first client devices 120, and second client device 122. DHCP server 110, router 112, first network device 114, second network device 116, border device 118, first client devices 120, and second client device 122 may operate in other environments and are not limited to computing device 300.

Computing device 300 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. Computing device 300 may comprise any computer operating environment, such as hand-held devices, multi-processor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    receiving, by a relay agent on a network device, a network configuration parameter request;
    adding, by the relay agent to the received network configuration parameter request, an address of a subnet to which a client device is associated and information data into an information field of the network configuration parameter request, the information data comprising an address of the network device and an identifier of the subnet to which the client device is associated;
    forwarding, by the relay agent, the network configuration parameter request, to a network configuration server;
    processing, by the network configuration server, the network configuration parameter request;
    forwarding, by the network configuration server, the processed network configuration parameter request to a border device;
    encapsulating, by the border device, the processed network configuration parameter request with information data extracted from the processed network configuration parameter request, wherein encapsulating the processed network configuration parameter request comprises,
        extracting the information data comprising a Source-Switch-IP address and a Virtual Network Identifier (VNI) from a Dynamic Host Configuration Protocol (DHCP) option 82 field of the processed network configuration parameter request, and
        creating a Virtual Extensible Local Area Network (VXLAN) header for the encapsulated network configuration parameter request using the Source-Switch-IP address and the VNI extracted from the DHCP option 82 field of the processed network configuration parameter request; and
    forwarding, by the border device to the network device, the encapsulated network configuration parameter request encapsulated with the created VXLAN header.

2. The method of claim 1, wherein receiving the network configuration parameter request comprises receiving the network configuration parameter request from the client device.

3. The method of claim 1, wherein receiving the network configuration parameter request comprises receiving the network configuration parameter request comprising a Dynamic Host Configuration Protocol (DHCP) request.

4. The method of claim 1, wherein adding the address of the subnet comprises adding the address of the subnet comprising a Gateway IP Address (GIADDR) of the subnet.

5. The method of claim 1, wherein adding the address of the subnet comprises adding the address of the subnet wherein the subnet is a Virtual Private Network (VPN).

6. The method of claim 1, wherein adding the information data into the information field of the network configuration parameter request comprises adding the information data into the information field of the network configuration parameter request wherein the information field comprises a Dynamic Host Configuration Protocol (DHCP) option 82 field.

7. The method of claim 1, wherein adding the information data into the information field of the network configuration parameter request comprises adding the identifier of the subnet to which the client device is associated to one of the following sub-fields of a Dynamic Host Configuration Protocol (DHCP) option 82 field: a circuit ID field and a remote ID field.

8. The method of claim 1, wherein adding the information data into the information field of the network configuration parameter request comprises adding the address of the network device to one of the following sub-fields of a Dynamic Host Configuration Protocol (DHCP) option 82 field: a circuit ID field and a remote ID field.

9. The method of claim 1, wherein forwarding the configuration parameter request to the network configuration server comprises forwarding the configuration parameter request to the network configuration server comprising a Dynamic Host Configuration Protocol (DHCP) server.

10. The method of claim 1, further comprising decapsulating, by the network device, the encapsulated network configuration parameter request.

11. A method comprising:
    receiving, by a border device, a processed network configuration parameter response having an address of a subnet to which a client device is associated and information data in an information field of the network configuration parameter response, the information data comprising an address of a network device and an identifier of the subnet to which the client device is associated;
    encapsulating, by the border device, the processed network configuration parameter response with information data extracted from the processed network configuration parameter response, wherein encapsulating the processed network configuration parameter response comprises,
        extracting the information data comprising a Source-Switch-IP address and a Virtual Network Identifier (VNI) from a Dynamic Host Configuration Protocol (DHCP) option 82 field of the processed network configuration parameter response, and
        creating a Virtual Extensible Local Area Network (VXLAN) header for the encapsulated network configuration parameter response using the Source-Switch-IP address and the VNI extracted from the DHCP option 82 field of the processed network configuration parameter response; and
    forwarding, by the border device to the network device, the encapsulated network configuration parameter response encapsulated with the created VXLAN header.

12. The method of claim 11, wherein receiving the processed network configuration parameter response comprises receiving the processed network configuration parameter response from a Dynamic Host Configuration Protocol (DHCP) server, the network configuration parameter response comprising a Dynamic Host Configuration Protocol (DHCP) offer.

13. The method of claim 11, wherein receiving the processed network configuration parameter response having the information data in the information field of the network configuration parameter response comprises receiving the processed network configuration parameter response having the information data in the information field wherein the information field comprises a Dynamic Host Configuration Protocol (DHCP) option 82 field.

14. The method of claim 11, wherein receiving the processed network configuration parameter response having the information data in the information field of the network configuration parameter response comprises receiving the processed network configuration parameter response having the information data in the information field wherein the information field comprises a Dynamic Host Configuration Protocol (DHCP) option 82 field wherein the identifier of the subnet to which the client device is associated is contained in one of following sub-fields of the DHCP option 82 field: a circuit ID field and a remote ID field.

15. The method of claim 11, wherein receiving the processed network configuration parameter response having the information data in the information field of the network configuration parameter response comprises receiving the processed network configuration parameter response having the information data in the information field wherein the information field comprises a Dynamic Host Configuration Protocol (DHCP) option 82 field wherein the address of the network device is contained in one of following sub-fields of the DHCP option 82 field: a circuit ID field and a remote ID field.

16. An apparatus comprising:
    a memory storage; and
    a processing unit coupled to the memory storage, wherein the processing unit is operative to:
        receive a processed network configuration parameter response having an address of a subnet to which a client device is associated and information data in an information field of the network configuration parameter response, the information data comprising an address of a network device and an identifier of the subnet to which the client device is associated;
        encapsulate the processed network configuration parameter response with information data extracted from the processed network configuration parameter response, wherein the processing unit being operative to encapsulate the processed network configuration parameter response comprises the processing unit being operative to,
            extract the information data comprising a Source-Switch-IP address and a Virtual Network Identifier (VNI) from a Dynamic Host Configuration Protocol (DHCP) option 82 field of the processed network configuration parameter response, and
            create a Virtual Extensible Local Area Network (VXLAN) header for the encapsulated network configuration parameter response using the Source-Switch-IP address and the VNI extracted from the DHCP option 82 field of the processed network configuration parameter response; and
        forward, to the network device, the encapsulated network configuration parameter response encapsulated with the created VXLAN header.

17. The apparatus of claim 16, wherein receiving the processed network configuration parameter response comprises receiving the processed network configuration parameter response from a Dynamic Host Configuration Protocol (DHCP) server, the network configuration parameter response comprising a Dynamic Host Configuration Protocol (DHCP) request.

18. The apparatus of claim 16, wherein the information field comprises a Dynamic Host Configuration Protocol (DHCP) option 82 field.

19. The apparatus of claim 16, wherein the information field comprises a Dynamic Host Configuration Protocol (DHCP) option 82 field wherein the identifier of the subnet to which the client device is associated is contained in one of following sub-fields of the DHCP option 82 field: a circuit ID field and a remote ID field.

20. The apparatus of claim 16, wherein the information field comprises a Dynamic Host Configuration Protocol (DHCP) option 82 field wherein the address of the network device is contained in one of following sub-fields of the DHCP option 82 field: a circuit ID field and a remote ID field.

* * * * *